May 2, 1967  G. W. COOK  3,316,768
MAGNETIC ANGULAR VELOCITY INDICATING SYSTEM
Filed Oct. 29, 1963
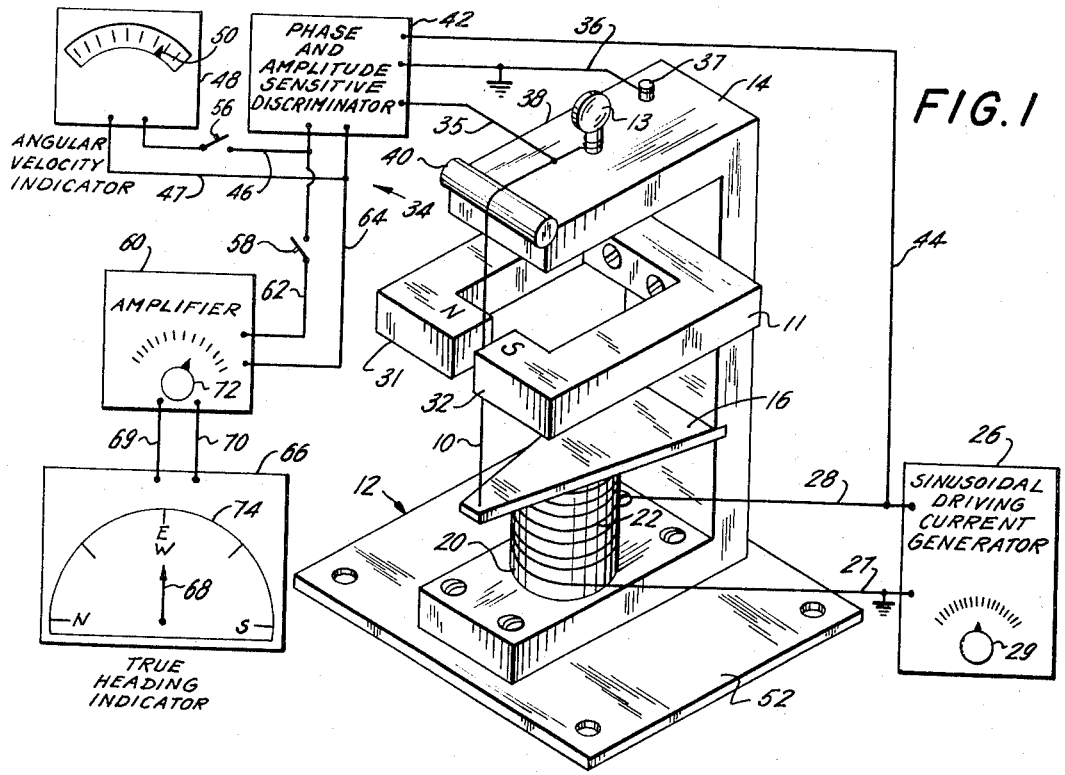
FIG. 1
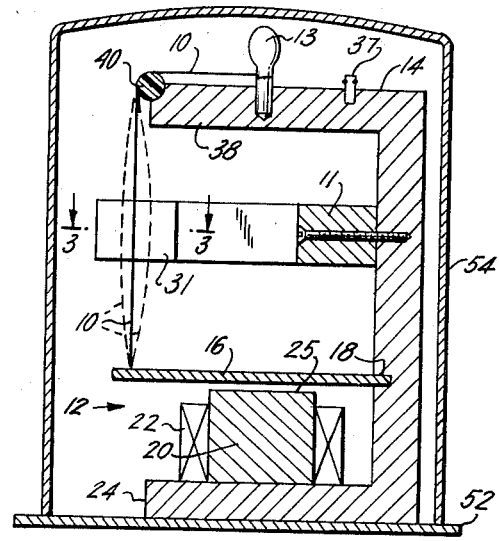
FIG. 2
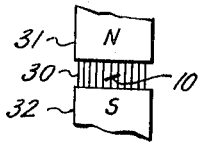
FIG. 3
FIG. 4
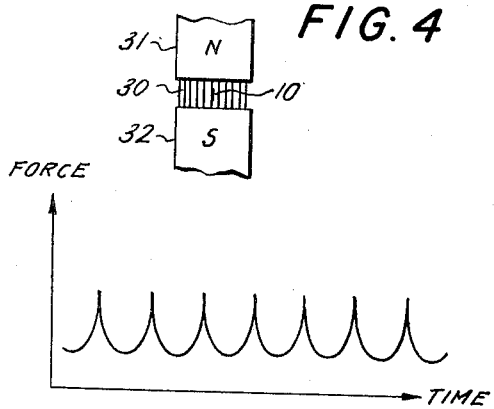
FIG. 5
INVENTOR.
GEORGE W. COOK
BY
Curtis, Morris & Safford
ATTORNEYS

United States Patent Office 3,316,768
Patented May 2, 1967

3,316,768
MAGNETIC ANGULAR VELOCITY INDICATING SYSTEM
George W. Cook, McLean, Va., assignor to Thiokol Chemical Corporation, Bristol, Pa., a corporation of Delaware
Filed Oct. 29, 1963, Ser. No. 319,735
8 Claims. (Cl. 73—505)

The present invention relates to magnetic angular velocity indicating systems and more particularly to magnetic angular velocity indicating systems which are adapted to indicate the angular velocity of a member or vehicle with which the system is used and also this invention relates to such systems adapted to indicate the direction of travel or heading of earth-bound vehicles, vessels and craft.

Among the many advantages of indicating systems embodying the present invention are those resulting from the fact that such systems are adapted to indicate the absolute direction of travel or heading of a vehicle or vessel on the earth with respect to the spin axis of the earth and thus with respect to the true geographic directions of north, east, south and west.

Among the further advantages of indicating systems embodying the present invention are those resulting from the fact that they contain no sensibly moving parts, i.e. unlike a gyro-mechanism these systems embodying the present invention have no spinning rotor, no gimbal rings and no rotation bearings. These systems embodying this invention are completely captive, in that they are rigidly mounted on a member on which they are being used, for example being rigidly mounted on the frame of a vehicle or vessel.

Further advantages of systems embodying the present invention result from the fact that, unlike the gyro-mechanism, they do not have to "remember" any initial caged position.

In a magnetic angular velocity indicating system (MAVIS) embodying the present invention an elongated flexible conductive tension element having a distributed mass, for example, such as a wire, chain, cable, braided element, or the like, is vibrated back and forth in a direction transversely with respect to the length of the element, i.e. with a sidewise or sidling movement. The central portion of this element is positioned in a magnetic field which extends perpendicularly to the length of the element. This vibrating element is electrically conductive and is connected to an external measurement circuit so that any voltage induced by the motion of the vibrating element in the magnetic field results in the flow of current in the element.

Whenever the element is vibrating in a direction such that the plane of its sidling vibrating is parallel with the lines of flux of the magnetic field, then there is no time rate of change of flux linkages with respect to the vibrating element; in other words the vibrating element does not "cut" any lines of flux, and hence there is no induced voltage in the element, and no current flow in the external circuit is produced. Whenever the element is vibrating with a component of motion perpendicular to the lines of flux, then there is a time rate of change of flux linkage so that a voltage is induced along the length of the element and hence current flows in the measurement circuit.

The interaction of the magnetic field produced by the current flowing in the vibrating element with the magnetic flux lines is such that the plane of oscillation of the vibrating element swings about the axis of the vibrating element until this plane of oscillation becomes aligned exactly parallel with the magnetic flux lines. Then the induced voltage has become reduced to zero, and the current flow ceases. In this respect, the vibrating element obeys the physical principle that all physical systems seek the condition and level of least work.

The distributed mass of the vibrating element has inertia such that the plane of vibration of the element tends to remain in the plane in which it is already moving. If the system is rotated with respect to the centerline of the element, then the lines of flux become positioned at an angle with respect to the plane of vibration. Consequently, the mode of oscillation of the element is forced to rotate until it becomes in alignment parallel with the new direction of the lines of flux. The electrical current which flows in the measurement circuit and the time during which it flows provide a measure of the physical work required to effect the rotation of the plane of vibration into alignment with the lines of magnetic flux. When the rotary motion of the system is steady, then the current output is also steady because the alignment effort must continue until after the rotation of the system has ceased. In addition, the magnitude of the current flow is proportional to the misalignment between the plane of vibration and the lines of magnetic flux, which in turn is proportional to the angular velocity of the system and hence of the frame on which it is mounted.

In order to avoid undesired damping of the movement of the vibrating element, this element together with its associated apparatus is shown mounted in an evacuated chamber to remove the influence of air or other gases upon the movement of the vibrating element.

It is an object of the present invention to provide a magnetic angular velocity indicating system (MAVIS) having numerous advantages in operation.

It is a further object of the present invention to provide a magnetic angular velocity indicating system which indicates true direction of travel, i.e. true heading, and is adapted for use on an earth-bound vehicle or vessel, such as a vehicle on land or a vessel at sea.

In this specification and in the accompanying drawings are described and shown magnetic angular velocity indicating systems embodying this invention and various modifications thereof are indicated, but it is to be understood that these are not intended to be exhaustive nor limiting of the invention, but on the contrary are given for purposes of illustration in order that others skilled in the art may fully understand the invention and the manner of applying these magnetic angular velocity indicating systems in practical use, and it is to be understood that the apparatus disclosed herein may be modified and adapted in various forms, each as may be suited to the conditions of a particular use.

The various objects, aspects and advantages of the present invention will be more fully understood from a consideration of the following description in conjunction with the accompanying drawings, in which:

FIGURE 1 is a perspective view of a magnetic angular velocity indicating system embodying the present invention and including an electric measurement circuit diagram;

FIGURE 2 is an elevational sectional view of the apparatus shown in FIGURE 1 and illustrating the sidling vibration of the wire, with the sidewise movement being greatly exaggerated for purposes of illustration;

FIGURE 3 is a partial sectional view taken along the line 3—3 of FIGURE 2 showing the sidling vibration of the element with a component of motion perpendicular to the lines of magnetic flux;

FIGURE 4 is a view similar to FIGURE 3 showing that the plane of vibration has become turned so that it is now exactly aligned parallel with the lines of magnetic flux; and FIGURE 5 is a plot of the waveform of the driving force applied to a cantilever arm which supports one end of the vibrating element.

As shown in FIGURES 1 and 2 an elongated flexible element 10 is vibrated sidewise to and fro in an intense magnetic field created by a permanent magnet 11, the element 10 being driven by vibration drive means 12. This flexible element 10 has a substantial mass distributed along its length, for example as in a wire, chain, cable, braided element, and the like, and is here shown by way of example as being a monofilament wire having a length of approximately 2 centimeters. This wire element 10 is stretched taut between a tension adjusting screw 13 mounted in a heavy frame member 14 and the narrow end of a truncated isosceles triangular cantilever arm 16. The wide end of the arm 16 is rigidly secured to the frame member 14 as by a force fit into a deep groove 18.

As will be explained in detail the arm 16 is formed of magnetically permeable material and forms a portion of the vibration drive means 12. The arm 16 is capable of being slightly deflected for purposes of driving the vibrating element 10. An alternating electromagnet, including a laminated core 20 with a winding 22 surrounding this core, is mounted upon the lower leg 24 of the C-shaped frame member 14. An exposed pole 25 of the core 20 is positioned near to the surface of the cantilever arm 16 so that when an alternating current is supplied to the energizing winding 22, a pulsating attractive force is exerted on the arm 16, tending to move it slightly. A low reluctance magnetic return circuit for this magnetic drive is provided by the base leg 24 and by the lower portion of the back of the frame member 14, which is conveniently formed of magnetically permeable material such as steel.

This pulsating attractive force tends to stretch the element 10 in the same pulsating mode as the frequency of the pulsating force. The alternating current reaches a maximum twice during each cycle. Consequently, if the arm 16 is not magnetically polarized it will be most strongly attracted to the pole 25 twice during each cycle of the driving current in the winding 22. The driving force on the arm 16 has a waveform as seen in FIGURE 5. Thus, an unpolarized arm 16 will tend to move at a frequency twice that of the energizing current which is supplied from a sinusoidal driving current generator through the leads 27 and 28 to the magnet winding 22. This A.C. source 26 may comprise any suitable source of sinusoidal alternating current, and it is shown here as an electronic oscillator of which the frequency is adjusted by turning a knob 29.

When the frequency of the driving current is the same as the natural frequency of sidling vibration of the taut wire element 10, this element vibrates sympathetically as its fundamental mode so that it swings to and fro in the magnetic field 30 (FIGURES 3 and 4) between the poles 31 and 32 of the magnet 11. The energizing force of attraction is twice the frequency of vibration of the wire element. The "pull down" force on the cantilever resembles the wave pattern (but inverted) of a full wave rectified sine wave. The crest (maximum) of the pull down (tension) force coincides with the maximum excursion or displacement of the vibrating wire element. The restoring force (tension) is at minimum at the instant when the wire element is swinging through center (mid) position and tension again rises to a maximum as the wire element swings out to its maximum displacement on the other side. Thus, when the device is properly adjusted for resonant condition as described the movement of the cantilever arm is minimized and the energy of the driving force is transferred into stretching of the wire element.

Consequently, as the wire element is vibrating, the magnetic force pulling down on the cantilever arm 16 is balanced by the increased tension of the wire as it swings away from center position toward the respective maximum excursions on opposite side of center. As a result, the movement of the cantilever is relatively small; the oscillation frequency is above the audible range. Thus, the amplitude of oscillation is small, but the time rate of change of flux linkage (rate of "cutting" lines of flux) is high by virtue of the high frequency of oscillation. This high frequency of oscillation and relatively short length of the wire element has the advantage (as compared with a larger wire element) of minimizing the undesired effects of machinery vibration or mechanical shocks such as may be present in the chassis of the craft in which the magnetic angular velocity indicating system is being used.

It will be noted that the magnetic field 30 in the region between the central areas of the faces of the poles 31 and 32 extends in a direction directly from one pole to the other. This magnetic field 30 is conventionally represented in FIGURES 3 and 4 by straight parallel lines of flux extending between the pole faces. Around the perimeter of the pole face there may be fringing of the magnetic field, and so the element 10 is centrally positioned between the pole faces where the magnetic flux lines are straight and parallel.

If the element 10 is vibrating in any plane other than parallel to the flux lines 30 there is a time rate of change of flux linkages with respect to the vibrating element; in other words the vibrating element may be said to "cut" lines of flux, and hence there is an induced voltage along the length of the element. Thus, there is current flow in the external measurement circuit 34 which is connected to this element 10 as will be explained further below.

When the element 10 is vibrating in a plane as shown in FIGURE 3 which is other than parallel with the magnetic field 30, then the interaction of the magnetic field produced by the current flowing in the vibrating element 10 with the magnetic flux lines 30 is such that the plane of oscillation of the vibrating element is forced to swing about the axis of the vibrating element until this plane of oscillation becomes aligned exactly parallel with the magnetic flux lines, as shown in FIGURE 4. Then the induced voltage becomes reduced to zero, and the current flow in the measurement circuit 34 ceases. The vibrating element 10 is thus obeying the physical principle that all physical systems seek the condition and level of least work.

In order to make connection with the measurement circuit 34, a lead 35 is connected to the upper end of the wire element 10, which is electrically insulated from the frame member 14. Another external lead 36 is connected to a conductive binding post 37 mounted in the upper arm 38 of the frame member 14. The element 10 passes over a support bridge 40 of insulating material, and the tension screw 13 is formed of insulating material so that there is an electrical circuit from the lead 35 along the length of the element 10 to the end of the arm 16. The circuit continues through this arm 16 and up the back of the frame 14 to the terminal 37 and thence into the other lead 36. This lead 36 and also the magnet winding lead 27 are connected to a common return circuit, i.e. are grounded, as shown in FIGURE 1

The electrical signal produced by the vibrating element 10 is fed by the leads 35 and 36 into a phase and amplitude sensitive discrimination circuit 42. Also, the energizing lead 28 is connected by a wire 44 into the discriminator 42 so as to provide a reference voltage for determining the phase of the signal produced by the vibrating element 10 with respect to the driving current, thus determining the direction of rotation of the system.

The output from the phase and amplitude sensitive discriminator 42 is supplied by a pair of leads 46 and 47 to an angular velocity indicator 48, which includes a volt meter mechanism with an indicating pointer 50. When the output from the discriminator 42 is zero, then the pointer 50 is at the center position. When the frame member 14 is rotated in a clockwise direction as seen in FIGURE 4 with respect to the plane of vibration of the element 10, then the pointer 50 moves to the right along the scale of the meter 48, and vice versa. The frame member 14 is mounted on a base plate 52, and the sensing apparatus is housed in an air-tight evacuated container 54. This container 54 and the base 52 are formed of magnetically permeable material to provide magnetic shielding for the sensing apparatus.

In operation the base plate 52 is rigidly mounted upon the frame of a vehicle or vessel. The vibrating element 10 acts in the nature of a pendulum, and the measurement output of the system is obtained by metering precisely the work required to force the plane of movement of this pendulum to follow the rotation of the frame member 14 about the axis of the element 10.

The distributed mass of the vibrating element 10 has inertia such that its plane of vibration tends to remain fixed in space in the plane in which it is already moving in the nature of a pendulum. If the frame member 14 is rotated with respect to the centerline of the element 10, then the element 10 is forced to change its plane of oscillation until it is once again in alignment with the magnetic lines of flux 30.

During the misalignment as shown in FIGURE 3 between the plane of vibration of the element 10 and the field 30, the output signal produced by the element 10 is proportional to the angular velocity of the frame member 14 about the axis of the element 10. The deflection of the pointer 50 in the meter 48 is proportional to the output signal from the discriminator 42, and thus it indicates the magnitude of the angular velocity. Moreover, the position of the pointer 50 to the right or left of the centerline of the meter scale indicates whether the angular rotation is clockwise or counterclockwise about the axis of the element 10 as seen looking in the direction 3—3. When the rotary motion of the frame member 14 is constant, then output from the discriminator 42 is also steady, because the re-alignment effort is continuing to act upon the vibrating element 10 until the rotation of the frame member 14 has ceased.

Three of these systems are used when it is desired to measure the angular velocity of a vehicle or vessel with respect to three mutually orthagonal axes.

It is to be noted that the angular velocity indicating system as described is adapted to be utilized on any type of vehicle, vessel, and craft either on the earth, at sea, under the sea, in the air, or in space.

Advantageously, the magnetic angular velocity indicating system described above is also adapted to indicate the absolute direction of travel or heading of earth-bound vehicles, vessels, and craft, with respect to the spin axis of the earth and hence with respect to the true geographic directions.

When the craft is stationary with respect to the earth, then the frame member 14 is being rotated by the earth's own rotation about its axis. If the centerline of the element 10 is pointing, i.e. heading, in a true east-west direction, then the frame member 14 does not rotate with respect to the plane of vibration of the element 10. However, if the centerline of the element 10 is heading in any direcion other than true east-west, then the rotation of the earth does produce a rotation of the frame member 14 with respect to the plane of vibration of the element 10, hence there is an output signal from the discriminator 42. It will be noted that in changing the heading of the element 10 slowly back and forth there will be a null or zero output whenever the true east-west direction is obtained. The effect of the earth's rotation upon the sensing apparatus reaches a maximum when the centerline of the element 10 is heading in a north-south direction so as to be most nearly parallel with the spin axis of the earth. The same effect occurs when the vehicle or vessel is traveling along a straight line with a constant heading; then the system may be used as described above.

If it is desired to indicate true geographic heading or direction of travel, the measurement system 34 is switched over to a more sensitive condition of operation, because the rate of the earth's rotation is usually relatively much slower than angular velocities produced during steering and maneuvering of the vehicle. A switch 56 in the line 46 is opened to disconnect the meter 48 from the discriminator 42, and a switch 58 is closed, thus connecting an amplifier 60 through leads 62 and 64 to the discriminator 42.

A true heading indicator 66 including a volt meter mechanism with a pointer 68 is connected by leads 69 and 70 with the output of the amplifier 60. The amplifier gain may be adjusted by a knob 72 to provide the desired sensitivity. When there is a null output, indicating a true east-west heading, then the pointer 68 is at the mid-position of the scale 74, which is the center balance position when the meter 66 has zero input. If, in the first instance, the helmsman is not sure whether the vehicle heading is true east or true west, he may resolve the ambiguity by reference to a compass. Thereafter, when the vehicle is turned away from its east-west orientation the pointer 66 moves along the scale 74 until it reaches a maximum at the true north or true south heading. As the vehicle continues to turn in the same direction, beyond due north or due south, as the case may be, then the pointer 66 now moves back toward the mid-scale position which is reached when the vehicle is again heading east-west. If the initial null was a due east heading, then the subsequent null following a maximum is a true west heading, and vice versa.

As used herein the term "vessel" is intended to include any vehicle, craft, ship, and the like, adapted to travel on land, on the sea, undersea, in the air or in space.

As used herein the term "earth-bound vessel" is intended to mean any vehicle, craft, ship and the like, adapted to travel on land, on the sea or undersea.

The term "elongated flexible conductive tension element" and similar langauge is intended to include a wire, chain, cable, braided element, and similar elements capable of being moved in sidling vibration when under tension.

From the foregoing it will be understood that the magnetic angular velocity indicating systems described herein as illustrative embodiments of the present invention are well suited to provide the advantages set forth and that all matter hereinbefore set forth or shown in the accompanying drawings is to be interpreted as illustrative and not in a limiting sense and that in certain instances some of the features of the invention may be used without a corresponding use of other features or may be modified into equivalent elements, all without departing from the scope of the invention as defined by the following claims.

What is claimed is:

1. A magnetic angular velocity indicating system for indicating the angular velocity of a member comprising a rigid frame adapted to be mounted on said member, a substantially triangular-shaped cantilever arm having one end secured to said frame, an elongated taut flexible conductive element extending between the frame and the free end of said arm, means for applying pulsating force to said arm for applying pulsating increase in tension to said element for vibrating said element with sidling motion, means for producing a transverse magnetic field around said vibrating element, and measurement means for indicating the electrical signal induced in said vibrating element for indicating the angular velocity of the member with respect to the centerline of said vibrating element.

2. A magnetic angular velocity indicating system for indicating the angular velocity of a member comprising a rigid frame adapted to be mounted on said member, a cantilever arm including magnetically permeable material and having one end secured to said frame, an elongated taut flexible conductive element extending from the frame to the free end of said arm, means for producing a transverse magnetic field around said vibrating element, an electromagnet closely adjacent to said arm, a source of sinusoidal driving current connected to said electromagnet for cyclically increasing the tension of said element at a resonant frequency of said element with respect to sidling vibration and measurement means for indicating the electrical signal induced in said vibrating element for indicating the angular velocity of the member in a plane perpendicular to the centerline of said vibrating element.

3. An angular velocity sensing system comprising an elongated flexible element having distributed mass, frame means for supporting said element under tension, means for applying to said element a periodically-recurring unidirectional tension force at a frequency of twice the resonant frequency of said element with respect to sidewise vibration thereof at its fundamental mode of vibration for vibrating said element sympathetically sidewise in its fundamental mode, and means for sensing the orientation of the plane of vibration of said element with respect to said frame means.

4. Apparatus as in claim 3 in which the variation of said force with respect to time has a sine loop waveform.

5. Apparatus as in claim 3 in which said force applying means includes a source of sinusoidal current having a frequency equal to said resonant frequency of said element.

6. Apparatus as in claim 3 in which said tension-applying means comprises a magnetically permeable member secured to one end of said element, an electromagnet mounted closely adjacent said member, and a source of alternating-polarity driving current connected to said member, the frequency of said driving current being equal to said resonant frequency of said element.

7. A magnetic angular velocity indicating system for indicating the angular velocity of a member comprising a rigid frame adapted to be mounted on said member, a cantilever arm including magnetically permeable material and having one end secured to said frame, an elongated taut flexible conductive element extending from the frame to the free end of said arm, magnet means having a pair of poles of opposite polarity on opposite sides of the central portion of said element for providing a transverse magnetic field about said element, an electromagnet closely adjacent to said arm, a source of sinusoidal driving current connected to said electromagnet for cyclically increasing the tension of said element at the resonant frequency of said element with respect to sidling vibration in its fundamental mode, insulation means for insulating said element from said frame, an electrical measurement circuit for measuring the sense and magnitude of the alternating electrical signal induced in said vibrating element, circuit means connecting said measurement circuit to said vibrating element at two points near the opposite ends of said element, an electrical connection between said source and said measurement circuit for providing a reference signal with respect to said cyclic increases in tension force, and a null-indicating meter in said measurement circuit for indicating the angular velocity of the member in a plane perpendicular to the centerline of said vibrating element.

8. A true east-west heading indicating system comprising a rigid frame, a cantilever arm including magnetically permeable material and having one end secured to said frame, an elongated taut flexible conductive element extending from the frame to the free end of said arm, magnet means having a pair of poles of opposite polarity on opposite sides of the central portion of said element for providing a transverse magnetic field about said element, an electromagnet closely adjacent to said arm, a source of sinusoidal driving current connected to said electromagnet for cyclically increasing the tension of said element at the resonant frequency of said element with respect to sidling vibration in its fundamental mode, insulation means for insulating said element from said frame, an electrical measurement circuit for measuring the sense and magnitude of the alternating electrical signal induced in said vibrating element, circuit means connecting said measurement circuit to said vibrating element at two points near the opposite ends of said element, said measurement circuit including a phase and amplitude sensitive discriminator, an electrical connection between said source and said discriminator for providing a reference thereto with respect to the phase of said alternating electrical signal, and a null-indicating meter in said measurement circuit connected to the output of said discriminator.

References Cited by the Examiner
UNITED STATES PATENTS

| | | | |
|---|---|---|---|
| 1,995,305 | 3/1935 | Hayes | 73—382 |
| 2,309,853 | 2/1943 | Lyman et al. | 73—505 X |
| 2,466,018 | 4/1949 | Ferrill. | |
| 2,546,158 | 3/1951 | Johnson | 73—505 X |
| 3,106,847 | 10/1963 | Mullins et al. | 73—505 |
| 3,153,351 | 10/1964 | Holmes | 73—517 X |

RICHARD C. QUEISSER, *Primary Examiner.*

JAMES J. GILL, *Examiner.*